Figure 1:
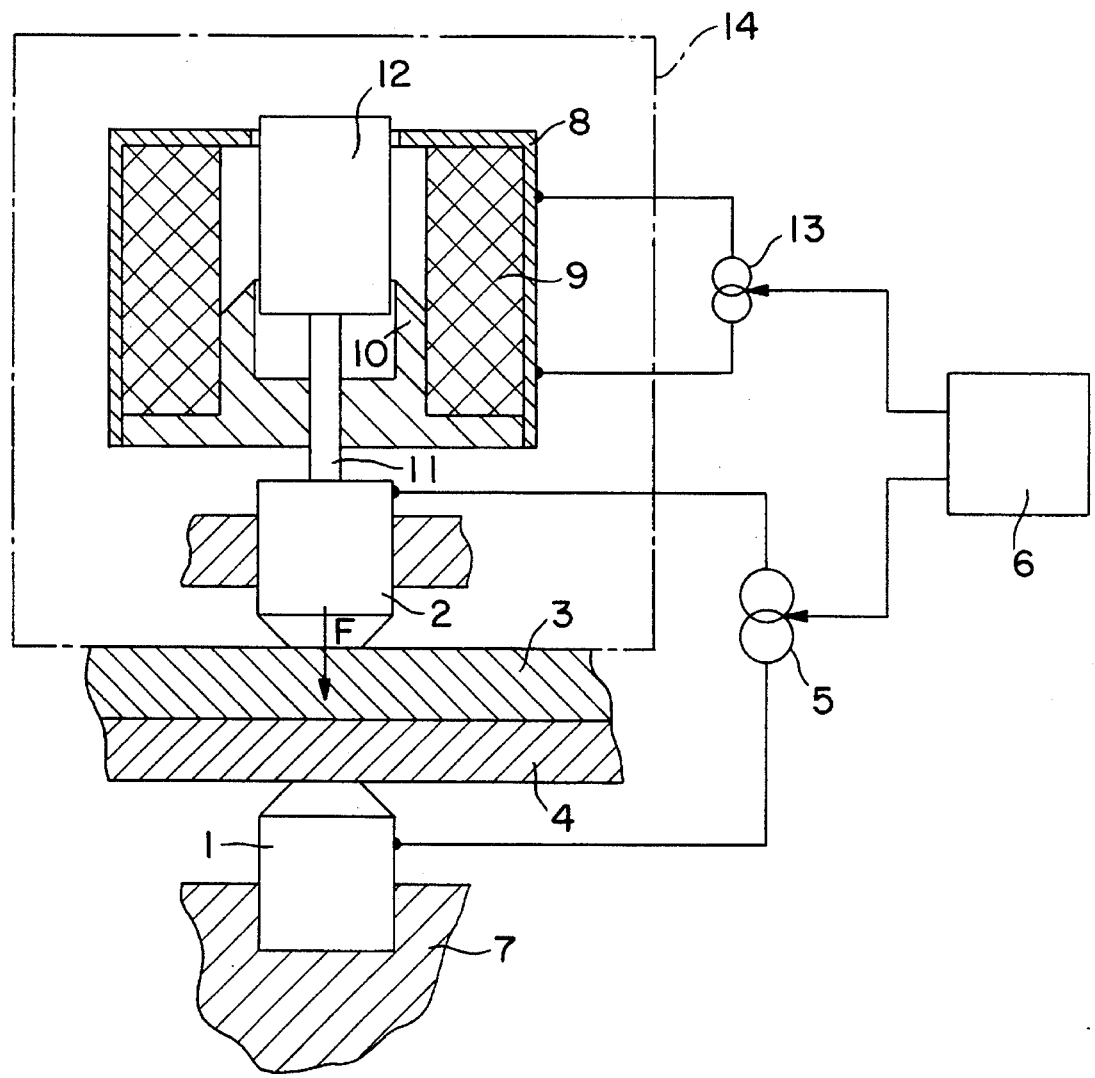

United States Patent [19]
Leon

[11] Patent Number: 5,556,552
[45] Date of Patent: Sep. 17, 1996

[54] HEAD FOR AND METHOD OF SPOT WELDING

[76] Inventor: Paul Leon, 2, Impasse des Sablons, 27630 Berthenonville, France

[21] Appl. No.: 407,059

[22] Filed: Mar. 17, 1995

Related U.S. Application Data

[63] Continuation-in-part of Ser. No. 207,394, Mar. 8, 1994, abandoned.

[30] Foreign Application Priority Data

Mar. 10, 1993 [FR] France .................................. 93 02976

[51] Int. Cl.⁶ .................................................. B23K 11/00
[52] U.S. Cl. ...................................... 219/86.32; 219/86.41
[58] Field of Search ............................ 219/86.32, 86.41, 219/86.51

[56] References Cited

U.S. PATENT DOCUMENTS

| | | |
|---|---|---|
| 1,327,792 | 1/1920 | Thornton, Jr. ........................ 219/86.32 |
| 1,354,293 | 9/1920 | Gravell . |
| 2,014,082 | 9/1935 | Fox . |
| 2,459,796 | 1/1949 | Dawson ................................ 219/86.32 |
| 2,948,804 | 8/1960 | Schueler et al. .................... 219/86.32 |
| 3,100,831 | 8/1963 | Wakeley ............................... 219/86.32 |
| 5,138,127 | 8/1992 | Fries et al. .......................... 219/86.32 |

FOREIGN PATENT DOCUMENTS 0122360  10/1984  European Pat. Off. .

*Primary Examiner*—Clifford C. Shaw
*Attorney, Agent, or Firm*—Laff, Whitesel, Conte & Saret, Ltd.

[57] ABSTRACT

The present invention relates a head for a spot welding apparatus or a setting apparatus comprising an electrode (2) for to supplying a welding current or setting current to a piece (3) to be welded to another piece (4) or to set and also, to exert, during the welding operation or setting operation, an axial force (F) on said piece (3). The head has an electromagnet (8) for transmitting the axial force (F) to the electrode (2).

9 Claims, 2 Drawing Sheets

HEAD FOR AND METHOD OF SPOT WELDING

This application is a continuation-in-part of application Ser. No. 08/207,394, filed Mar. 8, 1994, now abandoned.

The present invention relates to a head for a spot welding apparatus.

A spot welding apparatus is comprised of two electrodes which squeezes the pieces to weld and furnish, from the pieces to weld, a electric current of strong intensity to locally raise the temperature of the pieces to weld so as to form a spot weld. During the welding operation, the electrodes are applied to the pieces to weld with a certain determined axial strength.

Generally, one electrode is fixed while the other is axially mobile. The second electrode is mounted in an apparatus called a "head for welding". The head for welding enables the mobile electrode to assure its displacement in to a position of an electrode on a piece and equally exerting an axial force on the pieces.

A setting apparatus comprises a head such as was described with one mobile electrode that exerts an axial force on the piece to set. The head comprise a second electrode, but this electrode is not necessarily found aligned in the axis of the first electrode. The object of the invention relates equally to a head for a setting apparatus.

The welding apparatus or setting apparatus are generally controlled by a calculator that, during welding or setting operation, calculates, the function of measured parameters, such as the temperature of spot welding or setting or the relative displacement of the electrodes, new values of order for current intensity of welding or setting, axial strength intensity, etc. The calculator controls the apparatus in function of this new value.

The calculator works generally in cycles two phases: One phases measures the parameters of the operation; the second phase changes the values of order. Each cycle is of a relatively short duration so that the response times of current source and the response times of means that exert the pressing strength of the pieces to weld must also be as short as possible and at least as short as a cycle duration.

The duration of such a cycle is conventionally in the region of 10 ms, but it could be lower than 10 ms.

The response time of the current source does not produce any real problems.

The mobile electrode of the known heads of the welding apparatus or setting apparatus is generally controlled by one or two pneumatic jacks. One jack assures the displacement of the electrode to its position on one piece to weld and the other jack enables the application of the pressing strength to the pieces to be welded.

The means mentioned above cannot be satisfactory to obtain the short response times.

The purpose of the invention, therefore, is to provide a head for welding or setting in which the response time of the application of the axial force from the mobile electrode is less at one cycle duration of apparatus welding operation or apparatus setting operation.

For that, a head for a welding apparatus or for a setting apparatus, accordingly to the invention, is characterized in that an electromagnet is provided to transmit to the mobile electrode the axial force that is exert on one piece to weld or the piece to set during the welding or setting operation.

A fact that the axial force which is exerted by the mobile electrode has its origin in an electromagnet permits it to obtain the desired response times in response to an effort that is very weak. These weak response times are the result of a time required to establish the magnetic strengths in the electromagnet. That time depends on the electric and physics characteristics of the excitation-coil, and also to the inertia of the mobile pieces supporting the mobile electrode.

To improve the different parameters of adjusting the welding operation, we can now, for example, obtain the response times in the region of 1 ms.

This response time is improved again when the excitation-coil of said electromagnet is supplied by a current source that delivers a current with an intensity at one value of order.

By this characteristic, it is also possible to obtain the desired short response times, the limit being imposed by the characteristic electric parameters that the current source supplies to the excitation-coil of the electromagnet.

Figure 2:
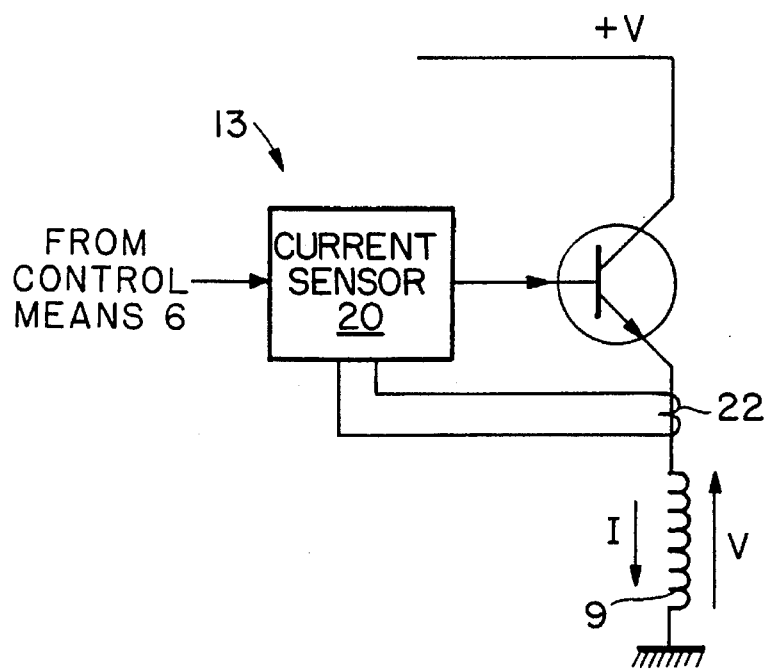
Figure 3:
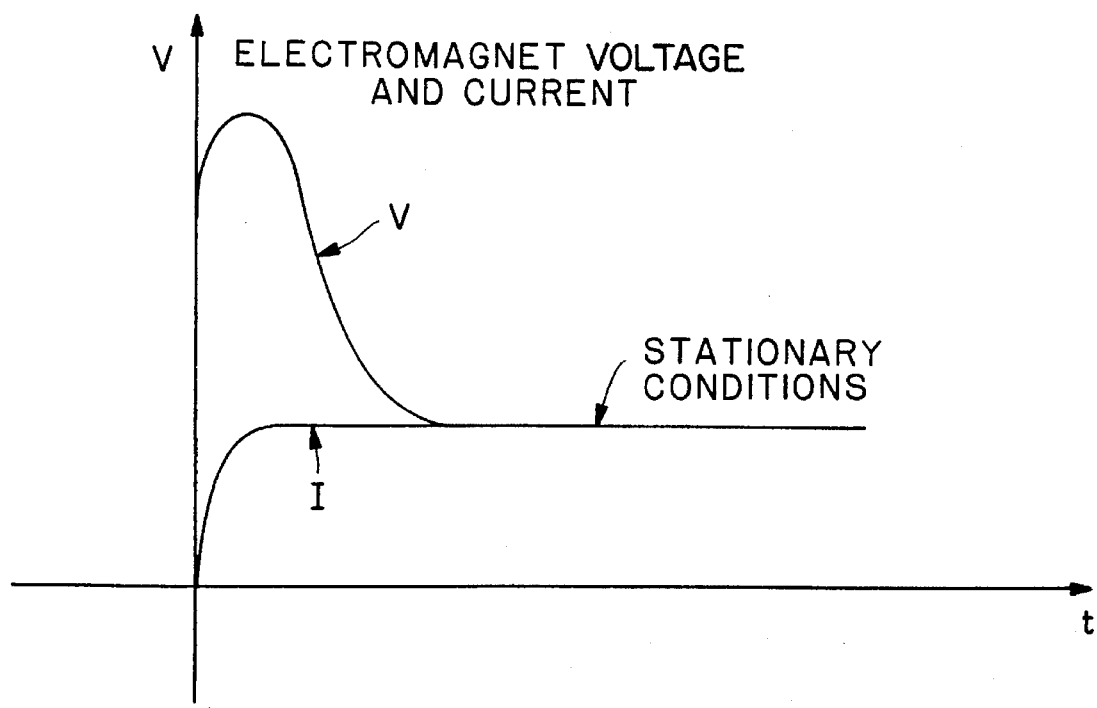

The characteristics of the invention that have been mentioned above, as well as others, will appear more clearly at the reading of the following description of one embodiment, that description being given with respect to the attached drawings in which:

FIG. 1 diagrammatically shows a welding apparatus having a head accordingly the invention;

FIG. 2 is a circuit diagram showing a detector-controller for sensing current in the winding of an electromagnet for controlling movement of an electrode in a welding machine; and FIG. 3 is a graph explaining the operation of the detector-controller of FIG. 2, in terms of voltage across and current through the winding of the electromagnet.

The welding apparatus comprises two coaxial electrodes 1 and 2 provided to squeeze two pieces 3 and 4 to be welded. They are connected electrically to a current source 5 to deliver the welding current to the pieces 3 and 4. The current source 5 is controlled from an unit control 6, such as a computer or microprocessor, for example.

The electrode 1 is mounted fixed on the frame 7 of the welding apparatus while the other electrode 2 is mobile in comparison to frame 7.

The mounting of the mobile electrode 2 is provided to be displaced axially then put in position against the pieces to weld 3 and 4. Thus taking either of two extremes positions: one position where the mobile electrode 2 find its self withdrawn and another position where the mobile electrode 2 is in contact with the piece to weld 3. The means that ensures the function described above, are not considered an object of the invention and are not exhibited on FIG. 1.

However, this mounting of the mobile electrode 2 is provided so that it can be in the position where the electrode 2 is in contact with the piece to weld 3, exerting an axial force F.

The means that assured this function are constituted of one electromagnet 8 having one excitation-coil or winding 9, a iron 10 pole face and a stem 11 with a core 12 that can slide in the iron face plate 10. When the excitation-coil 9 is supplied, with current the core 12 and the stem 11 are subjected to an axial electromagnetic strength.

The stem 11 is coaxial with the electrode 2 and is in contact with the electrode 2. Thus, the stem 11 transmits the electromagnetic strength produced by the electromagnet 9 to the electrode 2.

The excitation-coil or winding 9 is electrically connected to a current source 13 destined to be commanded by the unit control 6. The current source 13 is provided to deliver, at the excitation-coil 9, a current which has an intensity that controls the value of an order, delivered by the unit control 6.

A sensor (FIG. 2) comprises a transistor 19 having a base electrode coupled through a current sensor 20 to the controller 6 of FIG. 1. The collector is connected to +V of a power source. The emitter is connected to supply current through the electromagnetic winding 9 to ground. A current sensor pick up coil 22 is associated with the emitter path for supplying current to the winding 9. The pick up coil supplies a signal representative of the winding current to the sensor 20, which in turn allows the base signal to transistor 19.

The main feature of this current source control of transistor 19 is that the voltage V which is delivered from the DC source to the electromagnet winding 9 is much greater (about four times, for example) than the normal voltage level I which is necessary for a normal working of a stationary electromagnet. It is to be noted that this augmented voltage level V is supplied the instant when current is supplied to winding 9 in order to accelerate the movement of the movable welding electrode. Then the voltage of the electromagnet winding drops to a given level 1 which is appropriate for a stationary working electrode 2.

For example, the energizing level across winding 9 during the stationary electrode conditions may be 50 A, 20 volts. If so, the DC source voltage V should be much greater than 20 volts; say, 80 or 100 volts, during the initial acceleration period of electrode movement.

This invention is very important because it enables a reduction of the response time, which is not possible with prior art circuits.

To explain the inventive effect, the chart (FIG. 3) shows the voltage and the current changes, with time in the electromagnet. When current is detected in the winding 9, the applied voltage rises rapidly at V and later falls relatively slowly to level I. After the fall, the current I stays at a constant level. Because the electromagnet voltage can rise to the level V, it compensates for the induction lag time effect in the electromagnet winding responsive to the building of magnetic flux in the winding, which has heretofore limited the response time of the prior art systems.

The force exerted by the electromagnet is proportional to the amount of the current flowing through the electromagnet winding 9. Therefore, if the current can rise rapidly, the force applied by the electrode can be established rapidly and without the inductive lag. A response time of 1 ms can be obtained with the above mentioned feature.

The electromagnet 8 and the electrode 2 constituted the principal elements of a head for welding that is represented by a box formed by alternative long and short dashes 14.

Besides the quick response time, the head of the invention shows equally the advantage that the strength of force F that is exerted on the piece 3 is independent of the displacement of the mobile electrode 2 in comparison to this piece 3, more particularly during the welding operation.

The invention applies itself equally to the setting apparatus, more particularly the type of apparatus of this that have been described in the request of French patent No. 91 10901 that has been filed by the present applicant.

The claimed invention is:

1. A head for a spot welding apparatus comprising an electrode for supplying a welding current to a piece which is to be welded to another piece and also, to exert an axial force on said piece during a welding operation, said head further comprising an electromagnet having a winding for transmitting said axial force to said electrode, unit control means for controlling the excitation current to said electromagnet in response to measured parameters during welding, means for normally and selectively supplying current at a given voltage level to said winding of said electromagnet, and means responsive to an increase in an intensity of current to said electromagnet winding for increasing said voltage to a substantially higher voltage level during a limited period of time at the start of the axial force during an inductive lag.

2. A head for a welding setting apparatus comprised an electrode for supplying a setting current to a first piece which is to be welded and set on to another piece and also, to exert, during the setting operation, an axial force on said first piece, said head comprises an electromagnet having a winding for transmitting said axial force to said electrode, means for sensing current in said electromagnetic winding, a unit control means for controlling an excitation current to said electromagnet in response to measured parameters, said excitation current being supplied at a given level while said electrode is sitting in a stationary condition on said first piece, and means responsive to said current sensing means for sharply increasing said given level during said initial application of said current to said winding while flux builds in said winding to create a lag time effect.

3. A head according to claim 2, and a transistor coupled to supply an excitation-current to the winding of said electromagnet from a current source that delivers a current with an intensity controlled at said given normal level while said electrode is stationary, and means responsive to said current sensing means for initially increasing the current through said transistor and said winding.

4. A head for a spot welding apparatus or a setting apparatus, said head comprising an electrode for supplying a welding current or setting current to a piece which is to be welded to another piece or to set, said electrode exerting an axial force against said piece, during welding, an electromagnet for transmitting said force to said electrode, and control means for controlling an application of an excitation current in said electromagnet in response to parameters measured during said welding, said measured parameters including current in said electromagnet.

5. A head accordingly of claim 4, and a current source that delivers said excitation current to a winding of said electromagnet while the intensity is controlled to a value under control of said control means.

6. A welding machine comprising a pair of welding electrodes, electromagnetical means having a winding for moving said pair of welding electrodes together or apart responsive to an energization or deenergization of said winding, a transistor for controlling the energization or deenergization of said winding, said energization being normally at a given voltage level when said electrodes are together and stationary, sensor means coupled to measure an intensity of an energizing current in said winding, and control means responsive to said sensor means for controlling said transistor to apply an energizing voltage at a higher level during said moving of said electrodes.

7. The machine of claim 6 wherein said transistor has a base electrode coupled to said control means, a collector electrode coupled to one terminal of a power source, and an emitter coupled through said winding to a second terminal of said power supply.

8. The machine of claim 6 wherein said higher voltage level is in the order of 4–5 times higher than said given voltage level.

9. A welding machine comprising a pair of welding electrodes, electromagnetical means having a winding for moving said pair of welding electrodes together or apart responsive to an energization or deenergization of said winding, a transistor for controlling the energization or deenergization of said winding, said energization being normally at a given voltage level when said electrodes are together and stationary, sensor means coupled to measure an intensity of an energizing current in said winding, and control means responsive to said sensor means for controlling said transistor to apply an energizing voltage at a higher level during said moving of said electrodes, said sensor means having a current pick up coil associated with a coupling between an emitter on said transistor and said winding, and means responsive to said sensor means for applying said higher level of energizing voltage during an inductive lag time while magnetic flux is building in said winding.

* * * * *